United States Patent
Suzuki et al.

[19]

[11] Patent Number: 5,949,201
[45] Date of Patent: Sep. 7, 1999

[54] HORIZONTAL LINEARITY CORRECTING CIRCUIT

[75] Inventors: Hitoshi Suzuki; Eiji Kono, both of Kanagawa, Japan

[73] Assignee: Sony Corporation, Tokyo, Japan

[21] Appl. No.: 08/865,705

[22] Filed: May 30, 1997

[30] Foreign Application Priority Data

Jun. 11, 1996 [JP] Japan .................................. 8-149327

[51] Int. Cl.$^6$ .............................. G09G 1/04; H01J 29/74
[52] U.S. Cl. ........................ 315/370; 315/395; 315/410
[58] Field of Search .................................. 315/370, 371, 315/408, 411, 410, 395

[56] References Cited

U.S. PATENT DOCUMENTS

| | | | |
|---|---|---|---|
| 4,501,995 | 2/1985 | Olmstead et al. | 315/371 |
| 4,533,855 | 8/1985 | Willis et al. | 315/370 |
| 4,761,586 | 8/1988 | Wharton | 315/408 |
| 5,416,389 | 5/1995 | Merlo et al. | 315/370 |
| 5,517,090 | 5/1996 | Bando | 315/370 |
| 5,530,488 | 6/1996 | Rilly et al. | 315/371 |

*Primary Examiner*—Gregory C. Issing
*Attorney, Agent, or Firm*—Frommer Lawrence & Haug, LLP.; William S. Frommer

[57] ABSTRACT

A series circuit of first and second damper diodes (4a, 4b) and a series circuit of first and second resonance capacitors (5a, 5b) are connected in parallel between a collector and an emitter of a horizontal transistor (3). A series circuit of a horizontal deflecting winding (6), a capacitor (7) for an S-character correction, a capacitor (8) for blocking a direct current and a winding (9) for pin distortion modulation is connected in parallel between the collector and the emitter of the transistor (3). Further, connecting intermediate points of the damper diodes (4a, 4b), the resonance capacitors (5a, 5b) and the capacitors (7, 8) are connected to one another. A series circuit of a second capacitor (13) for the S-character correction and a switching device (14) formed of e.g., a MOS-FET element is connected in parallel to the capacitor (7) for the S-character correction. The switching device (14) is connected with a driving circuit (16) for supplying an arbitrary control pulse signal thereto from a saw tooth wave generating circuit (15a) and a comparing circuit (15b). According to the above-mentioned arrangement, the linearity and intermediate pin distortion do not become worse even when a deflecting width is changed.

6 Claims, 6 Drawing Sheets

HORIZONTAL LINEARITY CORRECTING CIRCUIT

BACKGROUND OF THE INVENTION

1. Field of the Invention

The present invention relates to a horizontal linearity correcting circuit suitable for use in an image display apparatus for displaying e.g., a television signal and an image signal from a personal computer.

2. Description of Related Art

For example, a horizontal deflecting circuit as shown in FIG. 1A is basically used in an image display apparatus for displaying, for example, a television signal. Namely, when a transistor Tr is turned on in FIG. 1A, a resonance capacitor Cc is short-circuited and an electric current having a constant inclination from a power source Vcc flows through a horizontal deflecting winding DY. When the transistor Tr is next turned off, the resonance capacitor Cc and the horizontal deflecting winding DY are resonated so that the electric current flowing through the horizontal deflecting winding DY becomes a sine wave.

A diode D is turned on when this electric current reaches a negative maximum value, i.e., when the potential of the horizontal deflecting winding DY across its both ends exceeds a zero potential and is lowered. Thus, the electric current having the constant inclination flows again through the horizontal deflecting winding DY. The diode D is turned off when a collector voltage of the transistor Tr becomes higher than the ground voltage. Accordingly, if the transistor Tr is turned on before the diode D is turned off, the electric current flows through the horizontal deflecting winding in an opposite direction without interruption so that the above operation is repeated. This repeating operation forms one period of horizontal deflection.

However, when a beam is made to scan at a constant speed in one period of such horizontal deflection, images at left-hand and right-hand ends of a tube screen are extended in comparison with a central portion of the tube screen. Therefore, as shown in FIG. 1B, a capacitor Cs is connected in series to the horizontal deflecting winding DY so that the waveform of a deflecting electric current is made dull. Thus, the scanning speed of the beam at each of both left-hand and right-hand ends of a horizontal scanning line is reduced so that left-hand and right-hand extensions of the image are vanished. This is an "S-character correction" and the above capacitor Cs is a capacitor for the S-character correction.

When the scanning operation is performed from a top of the screen to a bottom of the screen, the difference in path of the beam electric current from a deflecting center is geometrically long at the top and bottom of the tube screen so that an image is extended at the top and bottom of the tube screen and is shrunk at the center of the tube screen. This is an image distortion called a pin distortion. Therefore, a voltage of the capacitor Cs for the S-character correction is modulated in a parabola shape to correct such an image distortion such that this voltage is small at the beginning and the end of a vertical period and is large in an intermediate portion of this vertical period. This correction is a "pin distortional correction".

For example, as shown in FIG. 1B, a power source voltage Vcc is modulated in a parabola shape of the vertical period in the actual circuit and this power source Vcc is connected through a winding LOC in parallel to a series circuit of the horizontal deflecting winding DY and the capacitor Cs for the S-character correction. Thus, the power source voltage applied to the capacitor Cs for the S-character correction is modulated in the parabola shape to thereby realize the above-mentioned pin distortional correction. Thus, the above S-character correction and the pin distortional correction can be carried out in the horizontal linearity correcting circuit of the image display apparatus.

However, for example, when such corrections are carried out and the scanning operation is performed from the top of the screen to the bottom of the screen as mentioned above, horizontal deflecting angles at upper and lower ends of the tube screen and an X-axis shown in FIG. 2 are different from each other since the differences in path of the beam electric current from the deflecting center are geometrically different from each other on the tube screen, etc. Therefore, S-character correcting amounts of the deflecting electric current are also different from each other. Namely, a stronger S-character correcting amount is required at the center of the tube screen having a deflecting angle larger than that at each of the upper and lower ends of the tube screen.

Therefore, when the same S-character correcting amount is provided on the entire screen, the S-character correcting amount is small near the center of the screen in comparison with the upper and lower ends of the screen. As shown in FIG. 2, longitudinal lines of intermediate portions between the left-hand and right-hand ends of the screen and a Y-axis draw arcs in a convex shape toward the center even when the pin distortional correction can be made in both left-hand and right-hand end portions of the screen. This image distortion is called an "intermediate pin distortion" and tends to be strongly caused in comparison with a tube screen formed on a spherical surface particularly in a cathode ray tube having a cylindrical tube screen. This distortion also becomes notable when the deflecting angle is increased.

For example, a horizontal linearity correcting circuit generally called a diode modulator system is proposed with respect to such an intermediate pin distortion. For example, as shown in FIG. 3, this horizontal linearity correcting circuit of the diode modulator system is realized by constructing the above circuit of FIG. 1B at two stages and further modulating the capacity of a capacitor Cs2 corresponding to the capacitor for the S-character correction at a lower stage.

Namely, an electric current flowing through this capacitor Cs2 is changed in this circuit by changing voltages across both ends of the capacitor Cs2 at the lower stage so that an apparent capacity value of the capacitor Cs2 can be changed. Thus, resonance frequencies of the capacitors Cs1 and Cs2 for the S-character correction and the horizontal deflecting winding DY1 are changed so that the S-character correcting amount can be changed. Accordingly, for example, the above intermediate pin distortion can be corrected by modulating the power source voltage Vcc in the vertical period in this circuit.

However, the correcting amount of the intermediate pin distortion cannot be necessarily sufficiently obtained in such a circuit of FIG. 3. Namely, capacity values of the two capacitors Cs1 and Cs2 for the S-character correction are set in the circuit of FIG. 3 while trackings of the horizontal linearity and the intermediate pin distortional correction are performed. It is necessary to particularly set the correcting amount of the intermediate pin distortion to be large in a cathode ray tube CRT having a large deflecting angle.

In this case, the capacity value of the capacitor Cs2 for the S-character correction at the lower stage is reduced to increase the correcting amount of the intermediate pin distortion. However, in this case, the S-character correcting amount is also increased and a horizontal amplitude is shrunk at its both ends. Further, the capacity value of the capacitor Cs1 for the S-character correction at the upper stage is increased to reduce this S-character correcting amount. However, in reality, there is a limit in the increase in the capacity value of the capacitor so that a degree of freedom with respect to the reduction in the S-character correcting amount is small.

It is considered as another method that a coil Ls2 at the lower stage is set to a transformer structure and a secondary winding thereof is connected in series to the horizontal deflecting winding DY1 so as to increase the correcting amount and relax the shrinkages at both the ends of the horizontal amplitude. However, problems of a reduction in the variable range of a horizontal deflecting width, a large-sized structure of the transformer, etc. are caused. Further, the capacity values of the two capacitors are respectively fixed so that the correcting amount is changed by dispersion of parts, etc.

For example, when the horizontal deflecting width is changed in the above circuit, there is a fear that the horizontal linearity and the intermediate pin distortion become worse. Namely, when the capacity values of the above two capacitors Cs1, Cs2 for the S-character correction are set such that the horizontal linearity and the intermediate pin distortion are preferable at the time of a certain horizontal amplitude on the tube screen, the S-character correction is excessively made in the case of an amplitude equal to or smaller than this horizontal amplitude and is insufficiently made in the case of an amplitude equal to or greater than this horizontal amplitude. Therefore, for example, when the horizontal amplitude is shrunk to display a picture image of 4 to 3 on the tube screen of 16 to 9, the picture image is shrunk at its both ends and is distorted in a barrel shape in its intermediate portion.

With respect to problems to be solved, the correcting amount of the intermediate pin distortion is not necessarily obtained sufficiently in the conventional circuit. Further, when the horizontal deflecting width is changed, there is a fear that the horizontal linearity, the intermediate pin distortion, etc. become worse.

SUMMARY OF THE INVENTION

In view of such aspects, it is therefore, an object of the present invention to provide a horizontal linearity correcting circuit in which plurality of capacitors are connected to a horizontal deflecting winding and generates a scanning voltage across both ends thereof, and a part of these capacitors is arbitrarily connected or disconnected to change capacity values of the capacitors at an arbitrary time within a scanning period so that the correcting amount of an intermediate pin distortion is sufficiently obtained and horizontal linearity and an intermediate pin distortion do not become worse even when a horizontal deflecting width is changed.

According to an aspect of the present invention, there is provided a horizontal linearity correcting circuit which comprises a horizontal deflecting winding, plurality of capacitors coupled in series to the horizontal deflecting winding and generating a scanning voltage across both ends thereof, and switching means for connecting or disconnecting a part of these capacitors; the horizontal linearity correcting circuit being constructed such that the switching means has a control terminal for controlling a turning-on or turning-off operation at an arbitrary time within a scanning interval; and effective capacity values of the above coupled capacitors are changed at the arbitrary time within the scanning interval by the turning-on or turning-off control.

DETAILED DESCRIPTION OF THE PREFERRED EMBODIMENTS

Figure 1A:
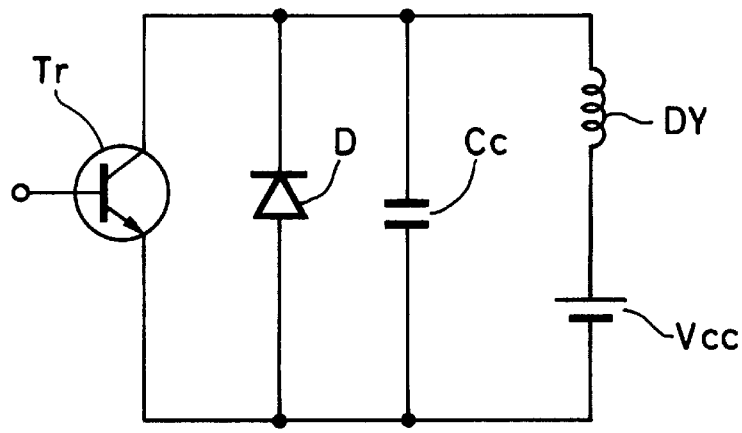
FIGS. 1A and 1B are views showing the construction of conventional horizontal linearity correcting circuits respectively.
Figure 1B:
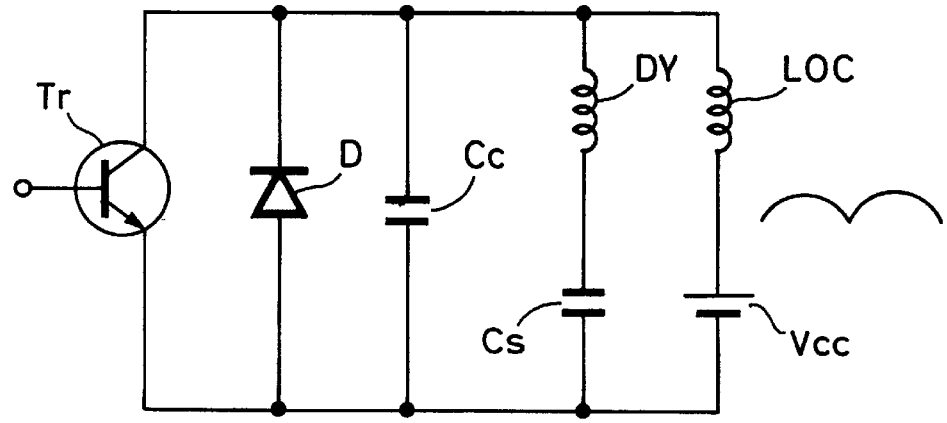
Figure 2:
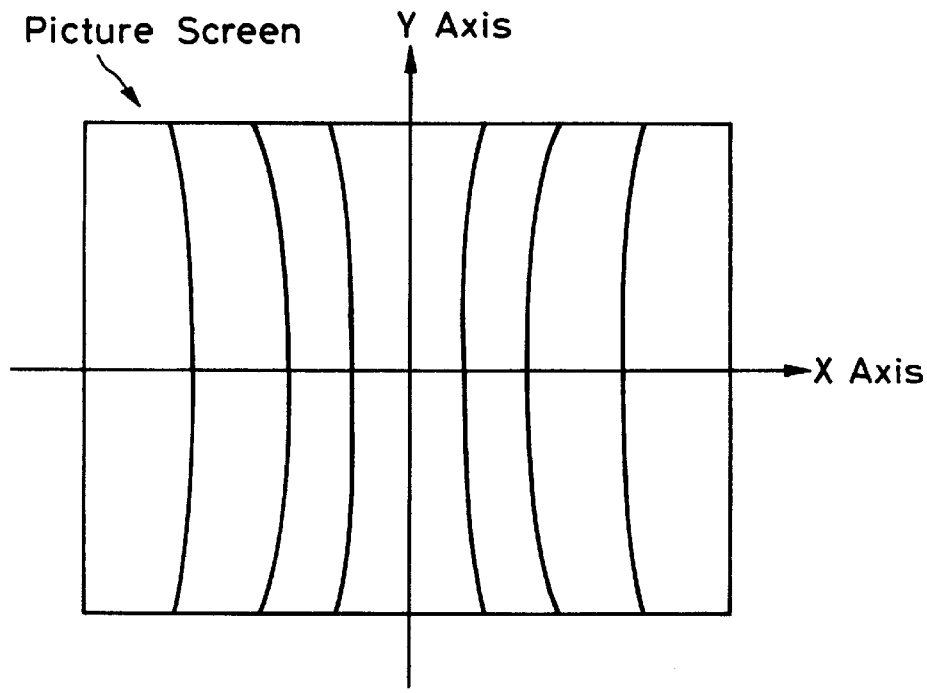
FIG. 2 is a view for explaining an intermediate pin distortion.
Figure 3:
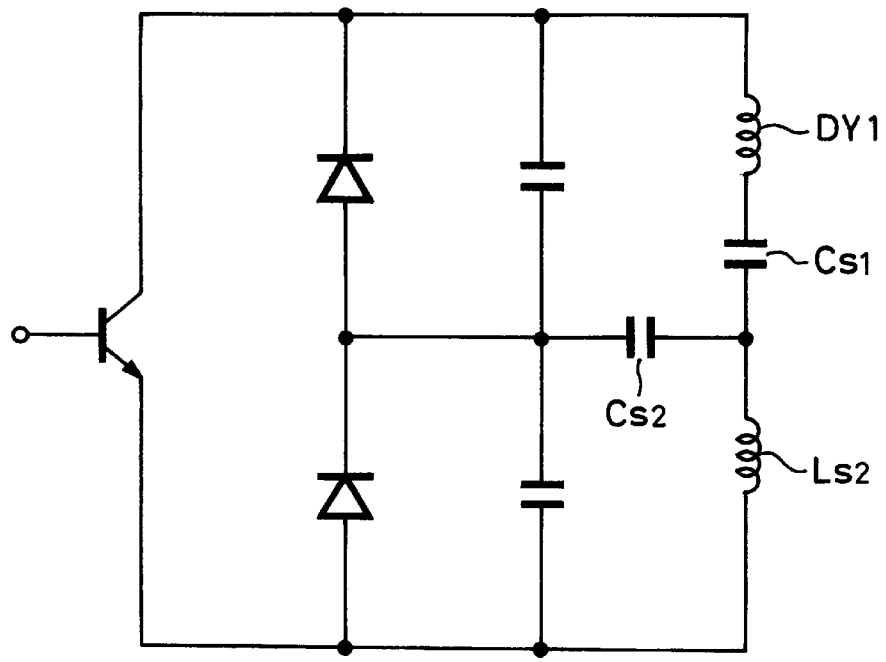
FIG. 3 is a constructional view showing other conventional horizontal linearity correcting circuit.
Figure 4:
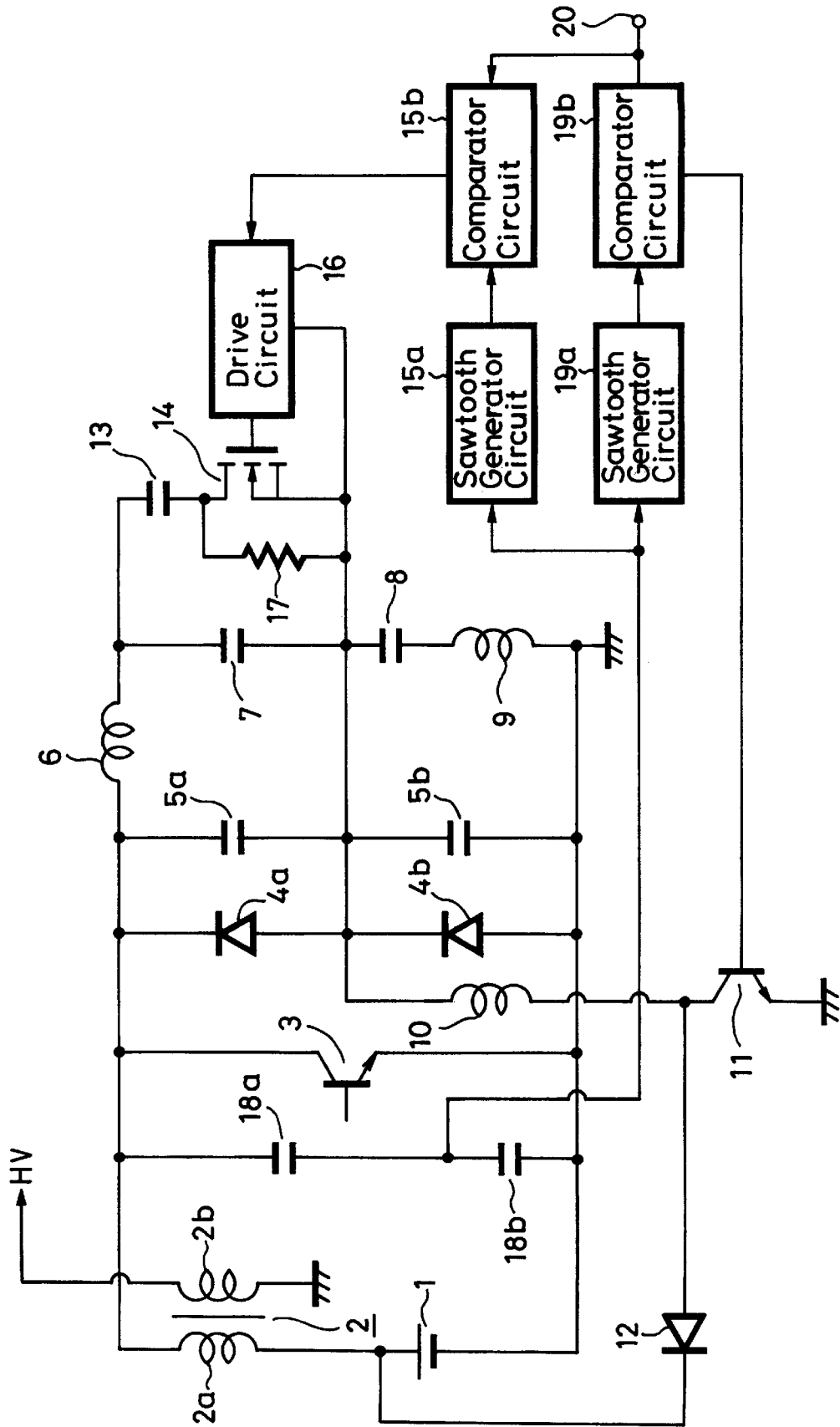
FIG. 4 is a constructional view showing one example of a horizontal linearity correcting circuit to which the present invention is applied.

The present invention will next be described with reference to the accompanying drawings. FIG. 4 is a constructional view showing one example of a horizontal linearity correcting circuit according to the present invention. In FIG. 4, a power source 1 is connected to the collector of a transistor 3 controlled in a horizontal period through a primary winding 2a of a high voltage generating transformer 2. A so-called high voltage HV is taken out of a secondary winding 2b of the transformer 2.

Further, a series circuit of first and second damper diode 4a, 4b and a series circuit of first and second resonance capacitors 5a), 5b are connected in parallel between the collector and an emitter of the transistor 3. A series circuit of a horizontal deflecting winding 6, a capacitor 7 for an S-character correction, a capacitor 8 for blocking a direct current and a winding 9 for pin distortion modulation is connected in parallel between the collector and the emitter of the transistor 3.

Connecting intermediate points of the above damper diodes 4a, 4b, the resonance capacitors 5a, 5b and the capacitors 7, 8 are connected to one another. One end of a winding 10 is connected to these connecting intermediate points, while the other end of the winding 10 is connected to the ground through a control element 11 and is also connected to the power source 1 through a diode 12. An operation of the control element 11 is controlled by a control pulse signal described later on. When the control element 11 is opened, an electric potential at the above connecting intermediate points is clamped to a voltage of the power source 1 by the diode 12.

Further, a series circuit of a second capacitor 13 for the S-character correction and a switching means 14 formed by e.g., a MOS-FET element is connected in parallel to the above capacitor 7 for the S-character correction. The switching means 14 is connected to a driving circuit 16 for supplying a control pulse signal from a comparing circuit 15b described later on. A resistor 17 is connected in parallel to the switching means 14 such that no excessive voltage is applied when the switching means 14 is opened.

Figure 5:
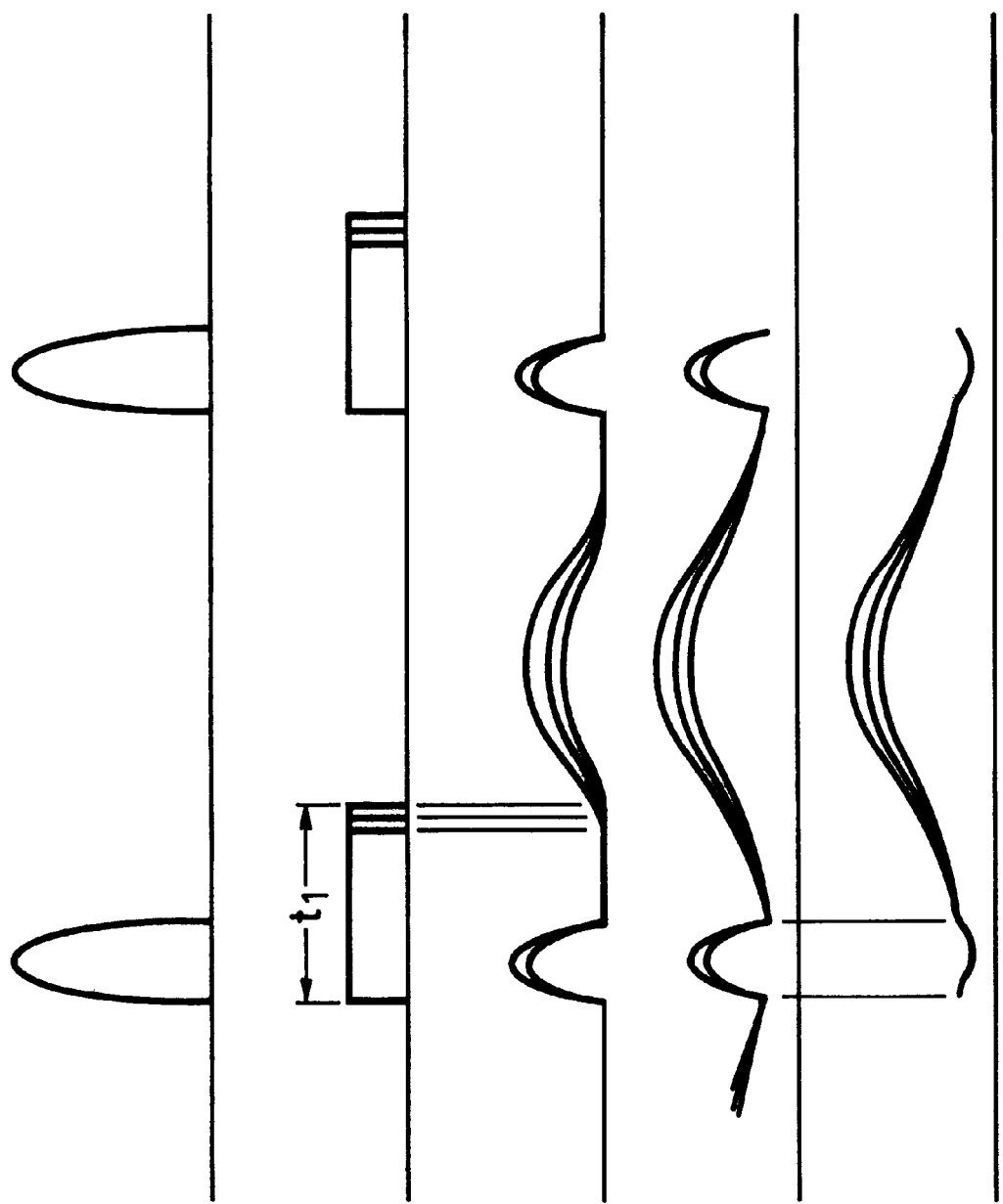
FIGS. 5A to 5E are waveform diagrams for explaining an operation of the horizontal linearity correcting circuit of the present invention shown in FIG. 4.

In the above circuit, the horizontal output transistor 3 is short-circuited in the latter half of a scanning interval. The first damper diode 4a, is short-circuited in the former half of the scanning interval. The resonance capacitors 5a and 5b constitute a resonance circuit together with the winding 2a, the winding 6, the capacitors 7, 8 and the windings 9, 10 in a retrace interval during which all of the transistor 3 and the damper diodes 4a, 4b are opened. For example, the resonance circuit generates a retrace pulse as shown in FIG. 5A.

A voltage of this retrace pulse is divided by capacitors 18a, 18b for detection. A sawtooth shaped wave having a constant amplitude is generated by a sawtooth-shaped wave generating circuit 15a in synchronization with the divided retrace pulse and is supplied to the comparing circuit 15b. Further, a parabola wave of a vertical period from a terminal 20 is supplied to this comparing circuit 15b. For example, a control pulse signal as shown in FIG. 5B is generated as a comparing output of the comparing circuit 15b. This control pulse signal is supplied to the switching means 14 through the driving circuit 16 and a control operation for connecting or disconnecting the second capacitor 13 for the S-character correction is performed.

Accordingly, when a horizontal amplitude is first set to be constant, a PWM waveform long at upper and lower ends of a tube screen and short at a center of the tube screen is formed in a pulse period t1 of the above control pulse signal. In this period t1, the switching means 14 is short-circuited and the capacitors 7, 13 are connected in parallel to the horizontal deflecting winding 6. In contrast to this, when the switching means 14 is opened at a controlled timing, a voltage just prior to this opening is held across both ends of the capacitor 13. At this time, only the capacitor 7 is connected to the horizontal deflecting winding 6.

Thus, since the capacity of the capacitor connected to the horizontal winding 6 is large at left-hand and right-hand ends of the screen in which the switching means 14 is short-circuited, a time change (di/dt) of a deflecting electric current i flowing through the deflecting winding 6 becomes gentle. In contrast to this, since the capacity of the capacitor connected to the horizontal deflecting winding 6 is reduced at the center of the screen in which the switching means 14 is opened, the time change of the deflecting electric current flowing through the deflecting winding 6 becomes sharp. Accordingly, the S-character correction can be made by changing the deflecting electric current in this way.

Namely, for example, as shown in FIG. 5C, an electric potential of the switching means 14 on a side of the capacitor 13 is equal to the electric potential at the connecting intermediate points of the above damper diodes 4a, 4b, etc. in the period t1. In contrast to this, when the switching means 14 is opened, the electric potential is changed in a parabola shape as shown in FIG. 5C. Further, when the switching means 14 is a MOS-FET element and its electric potential on the side of the capacitor 13 becomes negative, this element is turned on and is returned to the same state as a short-circuited state. At this time, an amplitude of a change in the electric potential is changed by a time interval of the period t1.

Further, a parabola wave formed by the capacity of a sum of the capacitors 7 and 13 is added to the electric potential of the capacitor 13 on a side of the horizontal deflecting winding 6 in a short-circuit period of the switching means 14 so that a waveform of the S-character correction as shown in FIG. 5D is obtained as a whole. At this time, a correcting voltage removing a retrace component from the above waveform is generated in the S-character correcting capacitor 7 as shown in FIG. 5E.

In this case, it is possible to obtain effects equal to effects obtained when a capacity value of the capacitor for the S-character correction connected to the horizontal deflecting winding 6 is continuously changed from the capacity value of only the capacitor 13 to the sum capacity value of the capacitors 7 and 13 by changing the time interval of the pulse period t1 of the above comparing output from "0" to "scanning time/2". Thus, the desirable S-character correction is made and horizontal linearity can be preferably held.

Further, in this circuit, the voltage of the retrace pulse is divided by the capacitors 18a and 18b for detection. Another sawtooth-shaped wave having a constant amplitude is generated by a sawtooth-shaped wave generating circuit 19a in synchronization with the divided retrace pulse and is supplied to a comparing circuit 19b. Further, the parabola wave of a vertical period from the terminal 20 is supplied to this comparing circuit 19b and a control pulse signal is generated thereby.

An electric current flowing through the winding 10 is adjusted by controlling the operation of the control element 11 by using a PWM waveform of this control pulse signal so that a ratio of average voltages applied to the resonance capacitors 5a and 5b is changed. Thus, the horizontal amplitude is changed.

Accordingly, since the horizontal amplitude is changed in accordance with the above parabola wave in this circuit, the time interval of the above period t1 is also changed in accordance with the horizontal amplitude. Thus, the horizontal linearity can be preferably held at any time by controlling the S-character correction.

Namely, in this circuit, a required S-character correcting amount can be also obtained at any time by controlling the time interval of the pulse period t1 in accordance with the horizontal frequency even in a horizontal deflecting circuit of a so-called multiscan system having a plurality of horizontal scanning frequencies.

Accordingly, the correcting amount of the intermediate pin distortion is sufficiently obtained by arranging the plurality of capacitors connected to the horizontal deflecting winding and generating a scanning voltage across both ends of the capacitors in this circuit, and changing capacity values of these capacitors at an arbitrary time within a scanning period by arbitrarily connecting or disconnecting a part of these capacitors. Further, the horizontal linearity and the intermediate pin distortion can be set such that the horizontal linearity and the intermediate pin distortion do not become worse even when the horizontal deflecting width is changed.

In the conventional circuit, no correcting amount of the intermediate pin distortion can be sufficiently obtained and there is a fear that the horizontal linearity, the intermediate pin distortion, etc. become worse when the horizontal deflecting width is changed. However, in accordance with the present invention, the horizontal deflecting width can be changed without making worse the horizontal linearity and the intermediate pin distortion. Further, the correcting amount of the intermediate pin distortion can be set to be large without reducing a variable range of the horizontal deflecting width.

Accordingly, in accordance with the present invention, a required S-character correcting amount can be obtained and the horizontal linearity can be preferably held at each of frequencies at any time even in a horizontal deflecting circuit of a so-called multiscan system particularly having a plurality of horizontal scanning frequencies.

Figure 6:
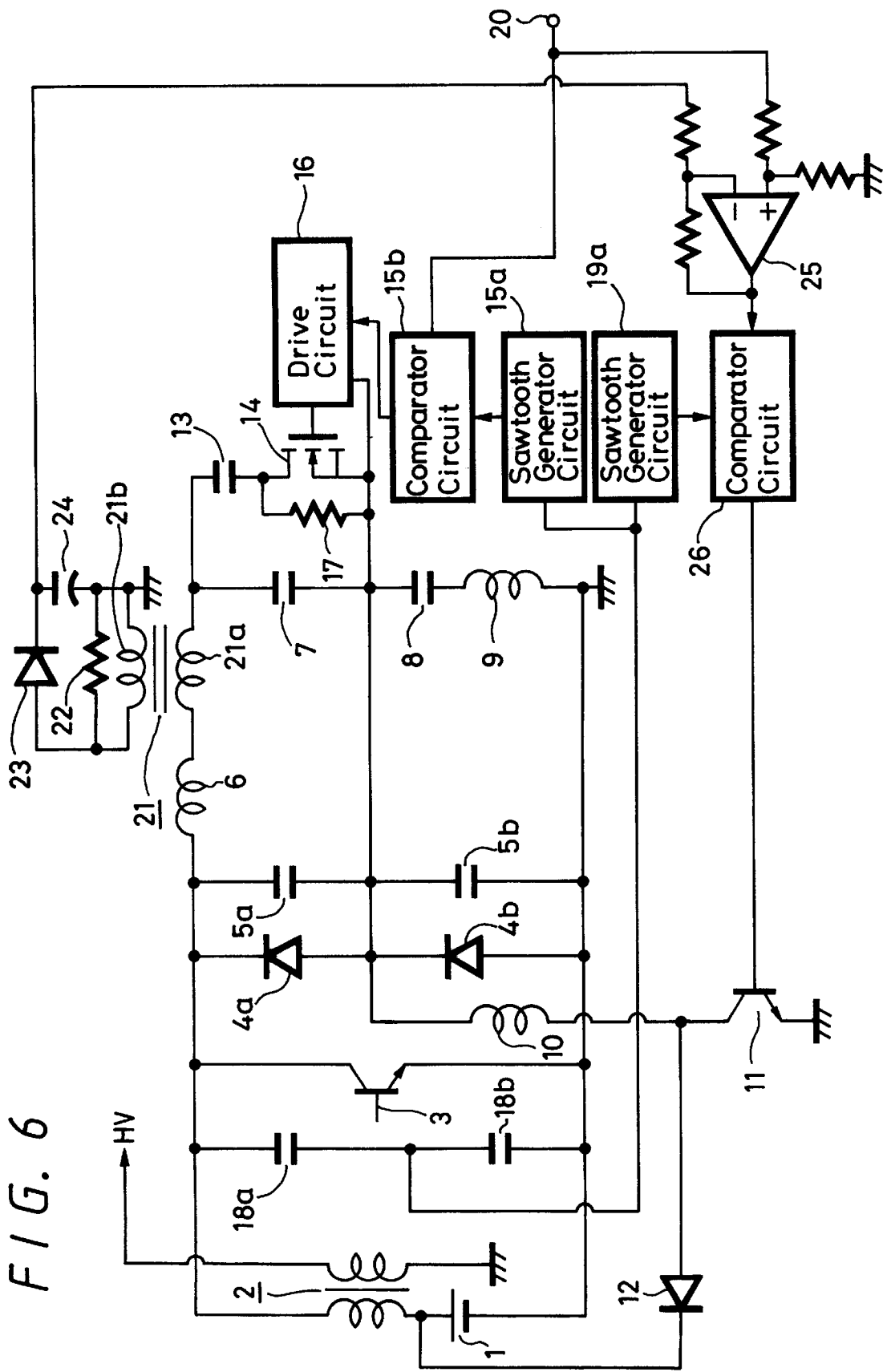
FIG. 6 is a constructional view showing another example of the horizontal linearity correcting circuit to which the present invention is applied.

FIG. 6 shows another embodiment of the horizontal linearity correcting circuit according to the present invention. In the following explanation, parts corresponding to those in the above embodiment of FIG. 4 are designated by the same reference numerals and an overlapping explanation thereof is omitted.

In this FIG. 6, a primary winding 21a of an electric current transformer 21 is connected in series to a horizontal deflecting winding 6. A resistor 22 is connected in parallel to a secondary winding 21b of this electric current transformer 21 and a deflecting electric current i is converted to a voltage. A peak value of this converted voltage is detected by a diode 23 and a capacitor 24. The voltage at this peak value is supplied to an error amplifier 25 and the difference between this voltage and the voltage of a parabola wave of a vertical period from a terminal 20 is amplified.

This differential voltage value is then compared with a sawtooth-shaped wave having a constant amplitude from a sawtooth-shaped wave generator 19a by a comparing circuit 26 in synchronization with a retrace pulse having a divided voltage from capacitors 18a, 18b for detection. The operation of a control element 11 is controlled by a comparing output of the comparing circuit 26. Thus, when an S-character correcting amount is changed in this circuit, it is possible to generate effects of restraining a change in peak-to-peak (p-p) value of the deflecting electric current i.

Namely, when the p-p value of the deflecting electric current i is changed, a horizontal amplitude is changed so that it is necessary to again adjust the horizontal amplitude. In contrast to this, the change in the p-p value of the deflecting electric current i is restrained in this circuit. Accordingly, it is effective particularly when the S-character correcting amount is changed within the same scanning frequency and a circuit has a plurality of scanning frequencies as in a multiscan system.

Further, since the S-character correcting amount can be controlled by changing the pulse period t1 as mentioned above in the above circuit, the "intermediate pin distortion" mentioned in the prior art can be corrected by modulating the period t1 in the vertical period. Namely, in this case, a larger S-character correcting amount at the center of the screen is required in comparison with the top and bottom of the screen. Accordingly, the S-character correction can be made by shortening the period ti at a central portion of the screen.

Figure 7A:
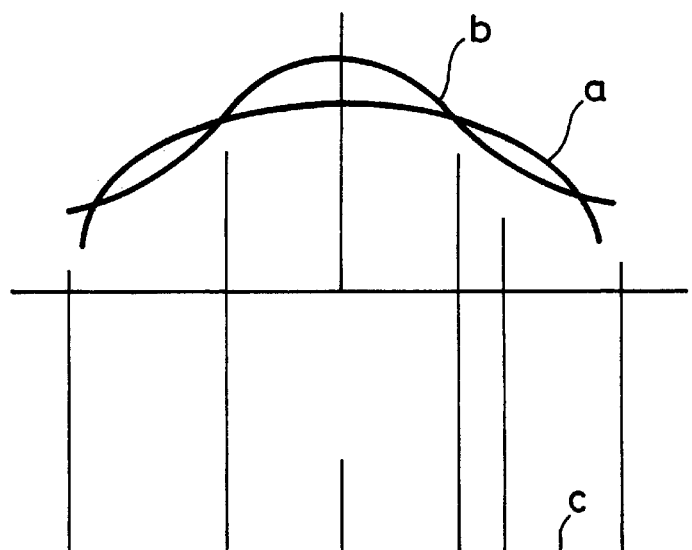
FIGS. 7A to 7C are waveform diagrams for explaining an operation of the horizontal linearity correcting circuit shown in FIG. 6.

For example, as shown by a curve a in FIG. 7A, a correcting waveform obtained by the winding and the capacitor becomes one portion of cos θ (θ is a deflecting angle) in the above circuit. In contrast to this, an actually required correcting waveform is $1/1+\tan^2\theta$ as shown by a curve b in FIG. 7A. Therefore, there is a case in which the problem of a so-called "M-character type linearity" is caused in the conventional circuit.

Figure 7B:
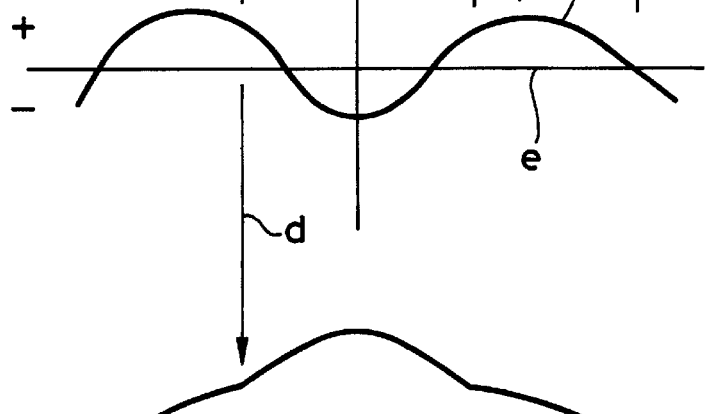

Namely, when the deflecting angle is small and flatness of the tube screen (a radius of curvature of the tube screen) is small, the difference between the above curves a and b is small and influences on the "linearity" are also small so that no problem is conventionally caused. However, when the deflecting angle is large and the flatness of the tube screen is increased, a picture image tends to be notably shrunk at both ends of the tube screen and a central portion of the tube screen and tends to be notably extended in an intermediate portion of the tube screen. FIG. 7B shows this situation. In FIG. 7B, the axis of abscissa shows a position of the tube screen and +(−) on the axis of ordinate shows that the picture image is extended (shrunk) in comparison with its average value.

Figure 7C:

When this extension (shrinkage) is corrected, for example, a correcting voltage is increased at both the ends and the central portion of the tube screen and is reduced in the intermediate portion of the tube screen as shown in FIG. 7C. Therefore, the correcting voltage can approach an ideal correcting voltage by switching S-character correcting voltages during a scanning interval in the above circuit. For example, the correcting voltage can approach the ideal correcting voltage by setting switching timing at a position shown by an arrow d in FIG. 7C.

Accordingly, the so-called M-character type linearity can be also corrected preferably in this circuit. For example, if the horizontal amplitude is set in a maximum widening state in the correction of the M-character type linearity, the M-character type linearity is not conspicuous so much in a widening state of the horizontal amplitude equal to or small than the maximum widening state. For example, the M-character type linearity is not conspicuous so much in a state in which a display of 4:3 is performed on the screen of 16:9. Accordingly, this correction can be applied to all widening states of the horizontal amplitude.

The above horizontal linearity correcting circuit has a horizontal deflecting winding, a plurality of capacitors coupled to this horizontal deflecting winding and generating a scanning voltage across both ends thereof, and switching means for connecting or disconnecting a part of these capacitors. The switching means has a control terminal for performing a turning-on or turning-off operation at an arbitrary time within a scanning interval. Capacity values of the coupled capacitors are changed at the arbitrary time within the scanning interval by control of the turning-on or turning-off operation. Accordingly, the correcting amount of an intermediate pin distortion is sufficiently obtained and the horizontal linearity and the intermediate pin distortion do not become worse even when a horizontal deflecting width is changed.

In accordance with this invention, the horizontal linearity correcting circuit has a plurality of capacitors coupled to the horizontal deflecting winding and generating a scanning voltage across both ends thereof. Capacity values of the coupled capacitors are changed at the arbitrary time within the scanning period by arbitrarily connecting or disconnecting a part of these capacitors. Accordingly, the correcting amount of the intermediate pin distortion is sufficiently obtained and the horizontal linearity and the intermediate pin distortion do not become worse even when the horizontal deflecting width is changed.

In the conventional circuit, there is a fear that no correcting amount of the intermediate pin distortion can be sufficiently obtained and the horizontal linearity, the intermediate pin distortion, etc. become worse when the horizontal deflecting width is changed. However, in accordance with the present invention, the horizontal deflecting width can be changed without making worse the horizontal linearity and the intermediate pin distortion, and the correcting amount of the intermediate pin distortion can be set to be large without reducing a variable range of the horizontal deflecting width.

Accordingly, in accordance with the present invention, a required S-character correcting amount can be also obtained at any time in a horizontal deflecting circuit of a so-called multiscan system particularly having a plurality of horizontal scanning frequencies. Accordingly, the horizontal linearity can be preferably held at each of the frequencies.

Further, in accordance with the present invention, the so-called M-character type linearity can be also preferably corrected.

Having described the preferred embodiments of the invention with reference to the accompanying drawings, it is to be understood that the invention is not limited to those precise embodiments and that various changes and modifications could be effected therein by one skilled in the art without departing from the spirit or scope of the novel concept of the invention as defined in the appended claims.

What is claimed is:

1. A horizontal linearity correcting circuit comprising:

a horizontal deflecting winding;

a first capacitor coupled in series to said horizontal deflecting winding;

a second capacitor;

switching means for selectively connecting or disconnecting said second capacitor to and from said first capacitor in parallel;

driving means for controlling turning-on and turning-off of said switching means for every horizontal scanning period;

a resonance circuit for generating a retrace pulse;

the turning-on time width of said switching means being varied in synchronism with a vertical scanning period; and a comparator circuit for comparing said retrace pulse and said vertical scanning period thereby synchronizing an effective capacity value of said second capacitor with said vertical scanning period.

2. The horizontal linearity correcting circuit as claimed in claim 1, wherein a peak value of a horizontal deflecting electric current flowing through said horizontal deflecting winding is detected and the horizontal deflecting electric current is controlled such that said detected value becomes constant.

3. The horizontal linearity correcting circuit as claimed in claim 1, wherein timing of said turning-on or turning-off control is changed in accordance with a set horizontal deflecting width.

4. The horizontal linearity correcting circuit as claimed in claim 1, wherein a pulse signal is supplied to said switching means and the width of said pulse signal is modulated by a signal having said vertical scanning period.

5. The horizontal linearity correcting circuit as claimed in claim 1, wherein turning-on and turning-off of said switching means is synchronized with a horizontal retrace pulse.

6. The horizontal linearity correcting circuit as claimed in claim 1, wherein said switching means is formed of a MOS-FET element.

* * * * *